United States Patent
Riebel

(10) Patent No.: US 7,332,119 B2
(45) Date of Patent: *Feb. 19, 2008

(54) BIOPOLYMER STRUCTURES AND COMPONENTS

(75) Inventor: Michael J. Riebel, Mankato, MN (US)

(73) Assignee: Poet Research, Sioux Falls, SD (US)

(*) Notice: Subject to any disclaimer, the term of this patent is extended or adjusted under 35 U.S.C. 154(b) by 148 days.

This patent is subject to a terminal disclaimer.

(21) Appl. No.: 10/868,263

(22) Filed: Jun. 14, 2004

(65) Prior Publication Data

US 2005/0019545 A1 Jan. 27, 2005

Related U.S. Application Data

(60) Provisional application No. 60/478,247, filed on Jun. 13, 2003, provisional application No. 60/478,248, filed on Jun. 13, 2003, provisional application No. 60/478,601, filed on Jun. 13, 2003.

(51) Int. Cl.
*B29C 45/00* (2006.01)

(52) U.S. Cl. ............... 264/299; 264/328.1; 264/328.18

(58) Field of Classification Search ............ 264/328.1, 264/299
See application file for complete search history.

(56) References Cited

U.S. PATENT DOCUMENTS

| | | | |
|---|---|---|---|
| 4,284,652 A * | 8/1981 | Christensen | 426/72 |
| 4,466,889 A | 8/1984 | Miller et al. | |
| 5,397,834 A | 3/1995 | Jane et al. | |
| 5,406,768 A * | 4/1995 | Giuseppe et al. | 52/730.4 |
| 5,441,801 A | 8/1995 | Deaner et al. | |
| 5,486,553 A | 1/1996 | Deaner et al. | |
| 5,497,594 A | 3/1996 | Giuseppe et al. | |
| 5,516,472 A | 5/1996 | Laver | |
| 5,518,677 A | 5/1996 | Deaner et al. | |
| 5,539,027 A | 7/1996 | Deaner et al. | |
| 5,596,080 A | 1/1997 | Pelosi | |
| 5,635,123 A * | 6/1997 | Riebel et al. | 264/125 |
| 5,725,939 A | 3/1998 | Nishibori | |
| 5,739,015 A | 4/1998 | Srinivasan | |
| 5,746,958 A | 5/1998 | Gustafsson et al. | |
| 5,851,469 A | 12/1998 | Muller et al. | |

(Continued)

FOREIGN PATENT DOCUMENTS

EP 0 082 581 A1 6/1983

(Continued)

OTHER PUBLICATIONS

Shewry, P. et al., "The Prolamin Storage Proteins of Sorghum and Millets", Rothamsted Research, Harpenden. Herts AL5 2JQ UK.

(Continued)

*Primary Examiner*—Monica A Huson
(74) *Attorney, Agent, or Firm*—Womble Carlyle Sandridge & Rice

(57) ABSTRACT

Structures can be formed from a composition, which can be referred to as a biopolymer, that includes fermentation solids and thermoactive material. Methods of making biopolymer products include for example extruding, injection molding, or compounding fermentation solid and thermoactive material. Structures formed from biopolymer can include lumber replacements, window components, door components, siding assemblies, and other structures.

8 Claims, 9 Drawing Sheets

U.S. PATENT DOCUMENTS

| | | | |
|---|---|---|---|
| 5,914,367 | A | 6/1999 | Dordick et al. |
| 5,948,524 | A | 9/1999 | Seethamraju et al. |
| 6,054,207 | A | 4/2000 | Finley |
| 6,122,877 | A | 9/2000 | Hendrickson et al. |
| 6,313,105 | B1 | 11/2001 | Bengs et al. |
| 6,323,265 | B1 * | 11/2001 | Bengs et al. ............ 524/56 |
| 6,527,532 | B1 | 3/2003 | Muller et al. |
| 6,593,625 | B2 | 7/2003 | Christiansen et al. |

FOREIGN PATENT DOCUMENTS

| | | |
|---|---|---|
| GB | 1 247 473 | 9/1971 |
| WO | WO 2004/057008 A1 | 7/2004 |
| WO | WO 2004/113435 A1 | 12/2004 |

OTHER PUBLICATIONS

Ikada et al., "Grafting of Proteins Onto Polymer Surfaces with the Use of Oxidized Starch,", J. Biomed. Mater. Res. Jul. 1979;13(4):607-22.

International Search Report mailed May 4, 2006.

International Search Report mailed May 22, 2006.

Blanch, J. et al., "Comprimidos de Accion Sostenida de Matriz Plastica," *Il Farmaco—Ed. Pr.*, vol. 23, No. 4, pp. 182-194 (1968).

Bromberg, L., "Blends and Semiinterpenetrating Networks of Zein and Poly(N,N-dimethylacrylamide)," *J. Phys. Chem.*, vol. 100, No. 32, pp. 13811-13814 (1996).

Demirci, A. et al., "Repeated-batch fermentation in biofilm reactors with plastic-composite supports for lactic acid production," *Appl. Microbiol. Biotechnol.*, vol. 43, pp. 585-589 (1995).

Kunduru, M. et al., "Continuous ethanol production by *Zymomonas mobilis* and *Saccharomyces cerevisiae* in biofilm reactors," *Journal of Industrial Microbiology*, vol. 16, pp. 249-256 (1996).

Shin, G. et al., "Preparation of Plastic and Biopolymer Multilayer Films by Plasma Source Ion Implementation," *J. Agric. Food Chem.*, vol. 50, No. 16, pp. 4608-4614 (2002).

Wu, Q. et al., "Studies on the toughness and water resistance of zein-based polymers by modification," *Polymer*, vol. 44, pp. 3901-3908 (2003).

Wu, Q. et al., "Chemical modification of zein by bifunctional polycaprolactone (PCL)," *Polymer*, vol. 44, pp. 3909-3919 (2003).

Yamada, K. et al., "Improved water resistance in edible zein films and composites for biodegradable food packaging," *International Journal of Food Science and Technology*, vol. 30, pp. 599-608 (1995).

* cited by examiner

US 7,332,119 B2

BIOPOLYMER STRUCTURES AND COMPONENTS

CROSS REFERENCE TO RELATED APPLICATION

This application claims priority to U.S. Provisional Patent Application Ser. Nos. 60/478,247 filed Jun. 13, 2003, 60/478,248 filed Jun. 13, 2003, and 60/478,601 filed Jun. 13, 2003.

FIELD OF THE INVENTION

Structures can be formed from a composition, which can be referred to as a biopolymer, that includes fermentation solids and thermoactive material. Methods of making biopolymer products include for example extruding, injection molding, or compounding fermentation solid and thermoactive material. Structures formed from biopolymer can include lumber replacements, window components, door components, siding assemblies, and other structures.

BACKGROUND OF THE INVENTION

A variety of products may be formed from filled plastics. For example, plastics may be formed into lumber replacements, as described in U.S. Pat. No. 5,539,027; components of window and door assemblies, as described in U.S. Pat. No. 5,486,553; or siding for building structures, as described in U.S. Pat. No. 6,122,877.

Fillers have been used in the plastic industry for almost 90 years. The reason most manufacturers use filled plastic is to reduce the price of the high cost of polypropylene and other plastics with lower cost fillers, such as wood flour, talc, mica, and fiberglass. Filling plastic with fiberglass can improve its characteristics by creating higher thermal stability and higher bending and rupture strengths. However, low cost fillers like wood flour can degrade some of the qualities of plastics and make it harder to process. Talc and mica provide some increase in strength to plastic, but also add weight and decrease the life of the extruder due to abrasion. Fiberglass adds considerable strength of the product, but at a substantial cost.

There are many disadvantages associated with existing plastics filled with plant material, such, such as wood or straw. A principal problem associated with the extrusion and injection of such plastics is that the particle size of the plant material used in this process is very small and is primarily ground wood. Otherwise, the viscosity of the mixture is too high to be extruded or molded efficiently. Moreover, extrusion or injection processes are further limited by the ratio of filler materials, such as wood, to the plastic that can be used. This puts undesirable constraints on the products that can be produced. Wood plastic composites typically use between 30% to 65% wood flour or fine wood saw dust mixed with simple plastics. Ratios higher than this cause both processing problems and overall performance degradation in areas of moisture absorption, rot, decay, moisture stability, and so on.

There remains a need for an inexpensive, biologically derived material that can reduce the cost and consumption of thermoactive materials and that performs better than a filler for products such as window and door assemblies, lumber replacements, siding for buildings, and other goods.

SUMMARY OF THE INVENTION

Structures can be formed from a composition, which can be referred to as a biopolymer, that includes fermentation solids and thermoactive material. Methods of making biopolymer products include for example extruding, injection molding, or compounding fermentation solid and thermoactive material. Structures formed from biopolymer can include lumber replacements, window components, door components, siding assemblies, and other structures.

In an embodiment, an article includes a biopolymer material which includes thermoactive material and fermentation solid. In an embodiment, the biopolymer can include about 5 to about 95 wt-% fermentation solid and about 1 to about 95 wt-% thermoactive material. In an embodiment the fermentation solid includes at least one of: distiller's dried grain, distiller's dried starchy root crop, distiller's dried tuber, and distiller's dried root. In an embodiment, the fermentation solid includes at least one of distiller's dried cereal grain and distiller's dried legume. In an embodiment, the fermentation solid includes distiller's dried corn, distiller's dried sorghum (milo), distiller's dried barley, distiller's dried wheat, distiller's dried rye, distiller's dried rice, distiller's dried millet, distiller's dried oats, and distiller's dried soybean.

In an embodiment, an article including biopolymer can be configured as a part of a window, a part of a door, a part of a piece of furniture. For example, the article may be configured for assembly into at least one of a window assembly, door assembly, and furniture assembly.

In an embodiment, an article including biopolymer can be configured as a lumber replacement member. The lumber replacement member can include a solid shell and a foamed core. The lumber replacement member can also include a textured surface on the solid shell.

In another embodiment, an article including biopolymer can be configured as an ornamental article.

In an embodiment, an article including biopolymer can include a foamed core. In an embodiment, an article including biopolymer can be configured to be assembled with another article through thermal welding.

In an embodiment, an article including biopolymer can be configured to include an interior surface defining a cavity, a strut extending into the cavity, and an anchor portion extending into the cavity, the anchor portion being configured to receive a fastener.

In an embodiment, an article including biopolymer can include at least one of a compression molded article, an extruded article, and an injection molded article.

In an embodiment, an article including biopolymer can include a layer of a second material on the biopolymer. In an embodiment, the layer of second material can include impression-formed features, a co-extruded material, or a powder coating.

In an embodiment, an article including biopolymer can be configured as a component of a siding assembly for a building. In an embodiment, the component of a siding assembly for a building can include a longitudinal member having a longitudinal body extending between first and second ends, the longitudinal member comprising biopolymer material, at least one of the first and second ends being configured to couple to a second component of a siding assembly. In an embodiment, the second component includes biopolymer material and is configured to be coupled to one of the ends of the longitudinal member by thermal welding. In an embodiment, the longitudinal member includes an altered surface having an altered appearance, the altered surface including at least one of a powdered coating, a textured surface, a printed surface. In an embodiment, a siding product can include hollow portions, foamed portions, webbed portions, or a combination thereof.

In an embodiment, the fermentation solid includes fermented protein solid. In an embodiment, the fermentation solid includes distiller's dried grain. In an embodiment, the distiller's dried grain further includes solubles, dried grain-200, and/or distiller's dried corn.

In an embodiment, an article including biopolymer includes about 50 to about 70 wt-% fermentation solid; and about 20 to about 50 wt-% thermoactive material.

In an embodiment, an article including biopolymer includes thermoactive material including at least one of thermoplastic, thermoset material, and resin, adhesive polymer, polyethylene, polypropylene, polyvinyl chloride, epoxy material melamine, polyester, phenolic polymer, and urea containing polymer.

In an embodiment, an article including biopolymer is in the form of an integral biopolymer, a composite biopolymer, or an aggregate biopolymer.

In an embodiment, an article including biopolymer is in the form of a composite biopolymer and the composite biopolymer has a granite-like appearance.

In an embodiment, an article including biopolymer includes at least one of dye, pigment, hydrolyzing agent, plasticizer, filler, preservative, antioxidants, nucleating agent, antistatic agent, biocide, fungicide, fire retardant, flame retardant, heat stabilizer, light stabilizer, conductive material, water, oil, lubricant, impact modifier, coupling agent, crosslinking agent, blowing or foaming agent, and reclaimed or recycled plastic.

In an embodiment, an article including biopolymer includes at least one of plasticizer, light stabilizer, and coupling agent.

One method of making an article includes forming the article from a composition including about 5 to about 95 wt-% fermentation solid; and about 0.1 to about 95 wt-% thermoactive material. A method may further include one or more of extrusion molding, injection molding, blow molding, compression molding, transfer molding, thermoforming, casting, calendering, low-pressure molding, high-pressure laminating, reaction injection molding, foam molding, and coating.

A method of fabricating a biopolymer lumber replacement article, window or door component, or siding component, can include heating the biopolymer; applying pressure to the heated biopolymer; shaping the heated biopolymer; and cooling the biopolymer to preserve an article shape. A method can further include applying a surface texture to the article. Shaping the biopolymer can include injection molding, extruding the biopolymer through a die to produce an extrusion, or other processes. Applying can includes pressing the article, which can include extraction of water from the biopolymer. In an embodiment, the method can include forming at a hollow and/or foamed portion in the he lumber replacement article, window, door, siding component, the hollow or foamed portion acting to increase the R value of the article or component.

DETAILED DESCRIPTION OF THE INVENTION

Overview

Figure 1:
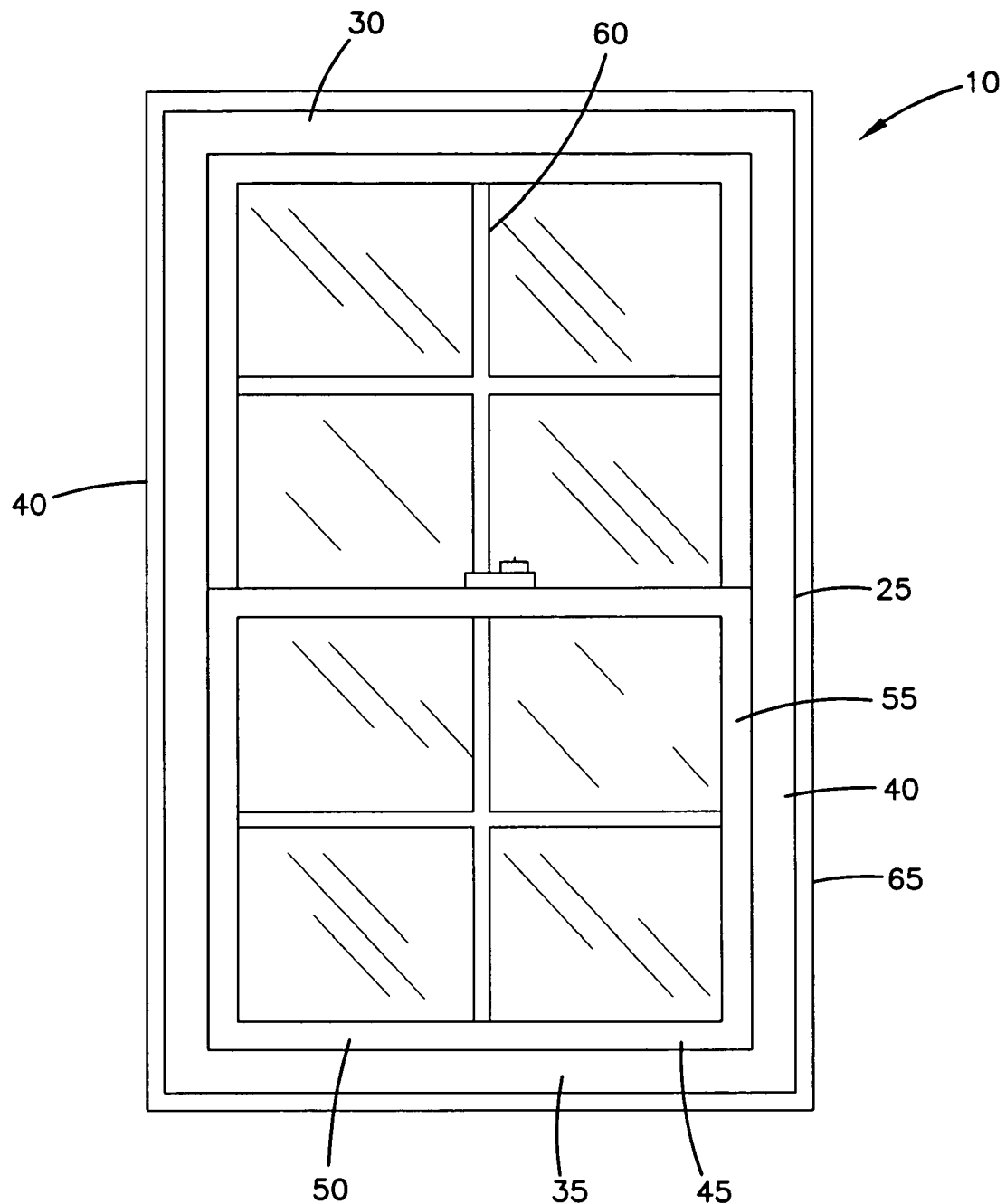
FIG. 1 shows a window assembly.
Figure 3:
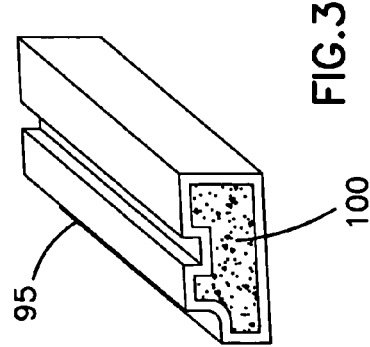
FIG. 3 shows a foamed extrusion product.

The present invention relates to articles fabricated from or including biopolymers including fermentation solid and thermoactive material. The present biopolymer can exhibit properties typical of plastic materials, properties advantageous compared to conventional plastic materials, and/or properties advantageous compared to aggregates including plastic and, for example, wood or cellulosic materials. The present biopolymer can be formed into useful articles using any of a variety of conventional methods for forming items from plastic. The present biopolymer can take any of a variety of forms. U.S. patent application Ser. No. 10/868,276 entitled "BIOPOLYMER AND METHODS OF MAKING IT" and filed evendate herewith describes the present biopolymer and related methods. This application is incorporated herein by reference.

Definitions

As used herein, the term "biopolymer" refers to a material including a thermoactive material and a fermentation solid.

As used herein, the phrase "fermentation solid" refers to solid material recovered from a fermentation process, such as alcohol (e.g., ethanol) production.

As used herein, the phrase "fermented protein solid" refers to fermentation solid recovered from fermenting a material including protein. The fermented protein solid also includes protein.

As used herein, the phrase "distiller's dried grain" (DDG) refers to the dried residue remaining after the starch in grain (e.g., corn) has been fermented with selected yeasts and enzymes to produce products including ethanol and carbon dioxide. DDG can include residual amounts of solubles, for example, about 2 wt-%. Distiller's dried grain includes compositions known as brewer's grain and spent solids.

As used herein, the phrase "distiller's dried grain with solubles" (DDGS) refers to a dried preparation of the coarse material remaining after the starch in grain (e.g., corn) has been fermented plus the soluble portion of the residue remaining after fermentation, which has been condensed by evaporation to produce solubles. The solubles can be added to the DDG to form DDGS.

As used herein, the phrase "wet cake" or "wet distiller's grain" refers to the coarse, wet residue remaining after the starch in grain (e.g., corn) has been fermented with selected yeasts and enzymes to produce products including ethanol and carbon dioxide.

As used herein, the phrase "solvent washed wet cake" refers to wet cake that has been washed with a solvent such as, water, alcohol, or hexane.

As used herein, the phrase "gluten meal" refers to a by-product of the wet milling of plant material (e.g., corn, wheat, or potato) for starch. Corn gluten meal can also be a by-product of the conversion of the starch in whole or various fractions of dry milled corn to corn syrups. Gluten meal includes prolamin protein and gluten (a mixture of water-insoluble proteins that occurs in most cereal grains) and also smaller amounts of fat and fiber.

As used herein, the phrase "plant material" refers to all or part of any plant (e.g., cereal grain), typically a material including starch. Suitable plant material includes grains such as maize (corn, e.g., whole ground corn), sorghum (milo), barley, wheat, rye, rice, millet, oats, soybeans, and other cereal or leguminous grain crops; and starchy root crops, tubers, or roots such as sweet potato and cassava. The plant material can be a mixture of such materials and byproducts of such materials, e.g., corn fiber, corn cobs, stover, or other cellulose and hemicellulose containing materials such as wood or plant residues. Preferred plant materials include corn, either standard corn or waxy corn. Preferred plant materials can be fermented to produced fermentation solid.

As used herein, the term "prolamin" refers to any of a group of globular proteins which are found in plants, such as cereals. Prolamin proteins are generally soluble in 70-80 percent alcohol but insoluble in water and absolute alcohol. These proteins contain high levels of glutamic acid and proline. Suitable prolamin proteins include gliadin (wheat and rye), zein (corn), and kafirin (sorghum and millet). Suitable gliadin proteins include $\alpha$-, $\beta$-, $\gamma$-, and $\omega$-gliadins.

As used herein, the term "zein" refers to a prolamin protein found in corn, with a molecular weight of about 40,000 (e.g., 38,000), and not containing tryptophan and lysine.

As used herein, the phrase "glass transition point" or "$T_g$" refers to the temperature at which a particle of a material (such as a fermentation solid or thermoactive material) reaches a "softening point" so that it has a viscoelastic nature and can be more readily compacted. Below $T_g$ a material is in its "glass state" and has a form that can not be as readily deformed under simple pressure. As used herein, the phrase "melting point" or "$T_m$" refers to the temperature at which a material (such as a fermentation solid or thermoactive material) melts and begins to flow. Suitable methods for measuring these temperatures include differential scanning calorimetry (DSC), dynamic mechanical thermal analysis (DTMA), and thermal mechanical analysis (TMA).

As used herein, weight percent (wt-%), percent by weight, % by weight, and the like are synonyms that refer to the concentration of a substance as the weight of that substance divided by the weight of the composition and multiplied by 100. Unless otherwise specified, the quantity of an ingredient refers to the quantity of active ingredient.

As used herein, the term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab producing a material or polymer. For example, the amount of a component of a product when modified by about includes the variation between batches in a plant or lab and the variation inherent in the analytical method. Whether or not modified by about, the amounts include equivalents to those amounts. Any quantity stated herein and modified by "about" can also be employed in the present invention as the amount not modified by about.

The Biopolymer

The present biopolymer includes fermentation solid and thermal active material. The biopolymer can take any of a variety of forms. In an embodiment, the present biopolymer includes fermentation solid integrated with the thermoactive material, which form is referred to herein as an "integrated biopolymer". In an embodiment, the integrated biopolymer forms a uniform mass in which the fermentation solid has been blended into the thermoactive material. In an embodiment, the present biopolymer includes features of the integrated biopolymer but has visible particles of remaining fermentation solid, which form is referred to herein as a "composite biopolymer". A composite biopolymer can have a granite-like appearance with a matrix of thermoactive material with a first appearance surrounding particles of fermentation solid with a second appearance. In yet another embodiment, the present biopolymer includes a significant portion of fermentation solid present as discrete particles surrounded by or embedded in the thermoactive material, which form is referred to herein as an "aggregate biopolymer".

In an embodiment, the compounded fermentation solid and thermoactive material (i.e., the soft or raw biopolymer), before hardening, takes the form of a dough, which can be largely homogeneous. As used herein, "largely homogeneous" dough refers to a material with a consistency similar to baking dough (e.g., bread or cookie dough) with a major proportion of the fermentation solid blended into the thermoactive material and no longer appearing as distinct particles. In an embodiment, the soft or raw biopolymer includes no detectable particles of fermentation solid, e.g., it is a homogeneous dough. In an embodiment, the soft or raw biopolymer can include up to 95 wt-% (e.g., 90 wt-%) fermentation solid and take the form of a largely homogeneous or homogeneous dough. In an embodiment, the soft or raw biopolymer can include about 50 to about 70 wt-% fermentation solid and take the form of a largely homogeneous or homogeneous dough.

In an embodiment, the raw or soft biopolymer includes visible amounts of fermentation solid. As used herein, visible amounts of fermentation solid refers to particles that are clearly visible to the naked eye and that provide a granite-like appearance to the cured biopolymer. Such visible fermentation solid can be colored for decorative effect in the cured biopolymer. The granite-like appearance can be produced by employing larger particles of fermentation solid than used to produce a homogeneous or largely homogeneous dough.

In certain embodiments, the biopolymer can include fermentation solid at about 0.01 to about 95 wt-%, about 1 to about 95 wt-%, about 5 to about 95 wt-%, about 5 to about 80 wt-%, about 5 to about 70 wt-%, about 5 to about 20 wt-%, about 50 to about 95 wt-%, about 50 to about 80 wt-%, about 50 to about 70 wt-%, about 50 to about 60 wt-%, about 60 to about 80 wt-%, or about 60 to about 70 wt-%. In certain embodiments, the biopolymer can include fermentation solid at about 5 wt-%, about 10 wt-%, about 20 wt-%, about 50 wt-%, about 60 wt-%, about 70 wt-%, or about 75 wt-%. The present biopolymer can include any of these amounts or ranges not modified by about.

In certain embodiments, the biopolymer can include thermoactive material at about 0.01 to about 95 wt-%, about 1 to about 95 wt-%, about 5 to about 30 wt-%, about 5 to about 40 wt-%, about 5 to about 50 wt-%, about 5 to about 85 wt-%, about 5 to about 95 wt-%, about 10 to about 30 wt-%, about 10 to about 40 wt-%, about 10 to about 50 wt-%, or about 10 to about 95 wt-%. In certain embodiments, the biopolymer can include thermoactive material at about 95 wt-%, about 75 wt-%, about 50 wt-%, about 45 wt-%, about 40 wt-%, about 35 wt-%, about 30 wt-%, about 25 wt-%, about 20 wt-%, about 15 wt-%, about 10 wt-%, or about 5 wt. The present biopolymer can include any of these amounts or ranges not modified by about.

In certain embodiments, the biopolymer can include fermentation solid at about 5 to about 95 wt-% and thermoactive material at about 5 to about 95 wt-%, can include fermentation solid at about 50 to about 70 wt-% and thermoactive material at about 30 to about 70 wt-%, can include fermentation solid at about 50 to about 70 wt-% and thermoactive material at about 20 to about 70 wt-%, can include fermentation solid at about 50 to about 60 wt-% and thermoactive material at about 30 to about 50 wt-%, or can include fermentation solid at about 60 to about 70 wt-% and thermoactive material at about 20 to about 40 wt-%. In certain embodiments, the biopolymer can include about 5 wt-% fermentation solid and about 70 to about 95 wt-% thermoactive material, about 10 wt-% fermentation solid and about 70 to about 90 wt-% thermoactive material, about 50 wt-% fermentation solid and about 30 to about 50 wt-% thermoactive material, about 55 wt-% fermentation solid and about 30 to about 45 wt-% thermoactive material, about 60 wt-% fermentation solid and about 20 to about 40 wt-% thermoactive material, about 65 wt-% fermentation solid and about 20 to about 40 wt-% thermoactive material, about 70 wt-% fermentation solid and about 10 to about 30 wt-% thermoactive material, about 90 wt-% fermentation solid and about 5 to about 10 wt-% thermoactive material. The present biopolymer can include any of these amounts or ranges not modified by about.

Fermentation Solids

The present biopolymer can include any of a variety of fermentation solids. Fermentation solid can be recovered from any of a variety of fermentation processes, such as alcohol (e.g., ethanol) production. A fermentation solid can be recovered from, for example, fermentation of plant material. Numerous fermentation solids have been characterized, primarily as animal feed. The fermentation solids that have been characterized include those known as distiller's dried grain (DDG), distiller's dried grain with solubles (DDGS), wet cake (WC), solvent washed wet cake (WWC), fractionated distiller's dried grain (FDDG), and gluten meal. Fermentation solid can include, for example, protein, fiber, and, optionally, fat. Fermentation solid can also include residual starch.

Distiller's dried grains or other distiller's dried plant materials can be derived from any of a variety of agricultural products. As used herein, "distiller's dried" followed by the name of a plant or type of plant refers to a fermentation solid derived from fermentation of that plant or type of plant. For example, distiller's dried grain refers to a fermentation solid derived from fermentation of grain. By way of a more specific example, distiller's dried corn refers to a fermentation solid derived from fermentation of corn. Distiller's dried sorghum refers to a fermentation solid derived from fermentation of sorghum (milo). Distiller's dried wheat refers to a fermentation solid derived from fermentation of wheat. A distiller's dried plant material need not be exclusively derived from the named plant material. Rather, the named plant material is the predominant plant material or the only plant material in the fermentation solid.

The present biopolymer can include any of a variety of fermentation solids including, for example, distiller's dried grain, distiller's dried starchy root crop, distiller's dried tuber, and distiller's dried root. Suitable distiller's dried grains include distiller's dried cereal grain and distiller's dried legume. Suitable distiller's dried grains include distiller's dried maize (distiller's dried corn, e.g., distiller's dried whole ground corn or distiller's dried fractionated corn), distiller's dried sorghum (milo), distiller's dried barley, distiller's dried wheat, distiller's dried rye, distiller's dried rice, distiller's dried millet, distiller's dried oats, distiller's dried soybean. Suitable distiller's dried roots include distiller's dried sweet potato and distiller's dried cassava. Suitable distiller's dried tubers include distiller's dried potato.

A fermentation solid derived from fractionated plant material is referred to herein as distiller's dried fractionated plant material, e.g., distiller's dried fractionated grain. The present biopolymer can include any of a variety of fractionated fermentation solids. For example, the present biopolymer can include distiller's dried fractionated corn. For example, the present biopolymer can include distiller's dried corn germ and/or distiller's dried corn endosperm.

In certain embodiments, the present fermentation solid (e.g., fermented protein isolate) reached a temperature (e.g., at the exit from the dryer) of no higher than about 500° F., about 400° F., about 300° F., about 250° F., about 200° F., or about 180° F. In an embodiment, the present fermentation solid (e.g., fermented protein isolate) reached a temperature (e.g., at the exit from the dryer) of no higher than about 500° F. In an embodiment, the present fermentation solid (e.g., fermented protein isolate) reached a temperature (e.g., at the exit from the dryer) of no higher than about 400° F. In an embodiment, the present fermentation solid (e.g., fermented protein isolate) reached a temperature (e.g., at the exit from the dryer) of no higher than about 300° F. In an embodiment, the present fermentation solid (e.g., fermented protein isolate) reached a temperature (e.g., at the exit from the dryer) of no higher than about 250° F. In an embodiment, the present fermentation solid (e.g., fermented protein isolate) reached a temperature (e.g., at the exit from the dryer) of no higher than about 200° F. In an embodiment, the present fermentation solid (e.g., fermented protein isolate) reached a temperature (e.g., at the exit from the dryer) of no higher than about 180° F. The present fermentation solid can include any of these temperatures not modified by about.

As used herein, "distiller's dried" followed by a number refers to a fermentation solid that reached a temperature (e.g., at the exit from the dryer) at or below that temperature. For example, distiller's dried grain-200 refers to distiller's dried grain that reached a temperature (e.g., at the exit from the dryer) at or below 200° F. In certain distillation processes, the plant material can also be ground. Grinding can subject plant material to elevated temperatures. As used herein, "distiller's dried" followed by a number with the suffix "gd" refers to a fermentation solid that was ground and dried reaching a temperature (e.g., at the exit from the dryer) at or below that temperature. For example, distiller's dried grain-200 gd refers to distiller's dried grain ground and dried and that reached a temperature (e.g., at the exit from the dryer) at or below 200° F. A fermentation solid that has been prepared by employing low temperature grinding and/or drying is referred to herein as "gently treated fermentation solid". A fermented protein solid that has been prepared by employing low temperature grinding and/or drying is referred to herein as "proteinaceous fermentation solid". Suitable gently treated fermentation solids include gently treated DDG and gently treated DDGS. Gently treated fermentation solids include those derived from fermentation processes lacking a cooking stage.

The present biopolymer can include or can be made from a fermentation solid with any of broad range of sizes. In certain embodiments, the fermentation solid employed in the biopolymer has a particle size of about 2 mesh to less than about 1 micron, about 2 to about 10 mesh, about 12 to about 500 mesh, about 60 mesh to less than about 1 micron, about 60 mesh to about 1 micron, about 60 to about 500 mesh.

Thermoactive Material

The biopolymer can include any of a wide variety of thermoactive materials. For example, the biopolymer can include any thermoactive material in which the fermentation solid can be embedded. In an embodiment, the thermoactive material can be selected for its ability to form a homogeneous or largely homogeneous dough including the fermentation solid. In an embodiment, the thermoactive material can be selected for its ability to covalently bond with the fermentation solid. In an embodiment, the thermoactive material can be selected for its ability to flow when mixed or compounded with fermentation solid. In an embodiment, the thermoactive material can set after being formed. Numerous such thermoactive materials are commercially available.

Suitable thermoactive materials include thermoplastic, thermoset material, a resin and adhesive polymer, or the like. As used herein, the term "thermoplastic" refers to a plastic that can once hardened be melted and reset. As used herein, the term "thermoset" material refers to a material (e.g., plastic) that once hardened cannot readily be melted and reset. As used herein, the phrase "resin and adhesive polymer" refers to more reactive or more highly polar polymers than thermoplastic and thermoset materials.

Suitable thermoplastics include polyamide, polyolefin (e.g., polyethylene, polypropylene, poly(ethylene-copropylene), poly(ethylene-coalphaolefin), polybutene, polyvinyl chloride, acrylate, acetate, and the like), polystyrenes (e.g., polystyrene homopolymers, polystyrene copolymers, polystyrene terpolymers, and styrene acrylonitrile (SAN) polymers), polysulfone, halogenated polymers (e.g., polyvinyl chloride, polyvinylidene chloride, polycarbonate, or the like, copolymers and mixtures of these materials, and the like. Suitable vinyl polymers include those produced by homopolymerization, copolymerization, terpolymerization, and like methods. Suitable homopolymers include polyolefins such as polyethylene, polypropylene, poly-1-butene, etc., polyvinylchloride, polyacrylate, substituted polyacrylate, polymethacrylate, polymethylmethacrylate, copolymers and mixtures of these materials, and the like. Suitable copolymers of alpha-olefins include ethylene-propylene copolymers, ethylene-hexylene copolymers, ethylene-methacrylate copolymers, ethylene-methacrylate copolymers, copolymers and mixtures of these materials, and the like. In certain embodiments, suitable thermoplastics include polypropylene (PP), polyethylene (PE), and polyvinyl chloride (PVC), copolymers and mixtures of these materials, and the like. In certain embodiments, suitable thermoplastics include polyethylene, polypropylene, polyvinyl chloride (PVC), low density polyethylene (LDPE), copoly-ethylene-vinyl acetate, copolymers and mixtures of these materials, and the like.

Suitable thermoset materials include epoxy materials, melamine materials, copolymers and mixtures of these materials, and the like. In certain embodiments, suitable thermoset materials include epoxy materials and melamine materials. In certain embodiments, suitable thermoset materials include epichlorohydrin, bisphenol A, diglycidyl ether of 1,4-butanediol, diglycidyl ether of neopentyl glycol, diglycidyl ether of cyclohexanedimethanol, aliphatic; aromatic amine hardening agents, such as triethylenetetraamine, ethylenediamine, N-cocoalkyltrimethylenediamine, isophoronediamine, diethyltoluenediamine, tris (dimethylaminomethylphe-nol); carboxylic acid anhydrides such as methyltetrahydrophthalic anhydride, hexahydrophthalic anhydride, maleic anhydride, polyazelaic polyanhydride and phthalic anhydride, mixtures of these materials, and the like.

Suitable resin and adhesive polymer materials include resins such as condensation polymeric materials, vinyl polymeric materials, and alloys thereof. Suitable resin and adhesive polymer materials include polyesters (e.g., polyethylene terephthalate, polybutylene terephthalate, and the like), methyl diisocyanate (urethane or MDI), organic isocyanide, aromatic isocyanide, phenolic polymers, urea based polymers, copolymers and mixtures of these materials, and the like. Suitable resin materials include acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials, polycarbonate materials, chlorinated polyether resins, polyethersulfone resins, polyphenylene oxide resins, polysulfone resins, polyimide resins, thermoplastic urethane elastomers, copolymers and mixtures of these materials, and the like. In certain embodiments, suitable resin and adhesive polymer materials include polyester, methyl diisocyanate (urethane or MDI), phenolic polymers, urea based polymers, and the like.

Suitable thermoactive materials include polymers derived from renewable resources, such as polymers including polylactic acid (PLA) and a class of polymers known as polyhydroxyalkanoates (PHA). PHA polymers include polyhydroxybutyrates (PHB), polyhydroxyvalerates (PHV), and polyhydroxybutyrate-hydroxyvalerate copolymers (PHBV), polycaprolactone (PCL) (i.e. TONE), polyesteramides (i.e. BAK), a modified polyethylene terephthalate (PET) (i.e. BIOMAX), and "aliphatic-aromatic" copolymers (i.e. ECOFLEX and EASTAR BIO), mixtures of these materials and the like.

Additives

The present biopolymer can also include one or more additives. Suitable additives include one or more of dye, pigment, other colorant, hydrolyzing agent, plasticizer, filler, extender, preservative, antioxidants, nucleating agent, antistatic agent, biocide, fuigicide, fire retardant, flame retardant, heat stabilizer, light stabilizer, conductive material, water, oil, lubricant, impact modifier, coupling agent, crosslinking agent, blowing or foaming agent, reclaimed or recycled plastic, and the like, or mixtures thereof. Suitable additives include plasticizer, light stabilizer, coupling agent, and the like, or mixtures thereof. In certain embodiments, additives can tailor properties of the present biopolymer for end applications. In an embodiment, the present biopolymer can optionally include about 1 to about 20 wt-% additive.

Methods of Making the Biopolymer

The present biopolymer can be made by any of a variety of methods that can mix thermoactive material and fermentation solid. In an embodiment, the thermoactive material and fermentation solid are compounded. As used herein, the verb "compound" refers to putting together parts so as to form a whole and/or forming by combining parts (e.g., thermoactive material and fermentation solid). The fermentation solid can be compounded with any of a variety of thermoactive materials, such as thermoset and thermoplastic materials. Any of a variety of additives or other suitable materials can be mixed or compounded with the fermentation solid and thermoactive material to make the present biopolymer. In an embodiment, compounding fermentation solid and thermoactive material produces the dough-like material described hereinabove.

Compounding can include one or more of heating the fermentation solid and thermoactive material, mixing (e.g., kneading) the fermentation solid and thermoactive material, and crosslinking the fermentation solid and thermoactive material. Compounding can include thermal kinetic compounding, extruding, high shear mixing compounding, or the like. In an embodiment, the fermentation solid and thermoactive material are compounded in the presence of hydrolyzing agent.

The biopolymer or biopolymer dough can be formed by melting together the fermentation solid and the thermoactive material. In contrast, thermal kinetic compounding of wood particles and thermoactive material produces a material in which wood particles are easily seen as individual particles suspended in the plastic matrix or as wood particles coated with plastic. Advantageously, the compounded fermentation solid and thermoactive material can be an integrated mass that is homogenous or nearly so.

The compounded, raw or soft biopolymer can be used directly or can be formed as pellets, granules, or another convenient form for converting to articles by molding or other processes.

Thermal Kinetic Compounding

Thermal Kinetic Compounding ("TKC") can mix and compound employing high speed thermal kinetic principals. Thermal kinetic compounding includes mixing two or more components with high shear speeds using an impeller. Suitable thermal kinetic compounding apparatus are commercially available, for example, the Gelimat G1 (Draiswerke Company). Such a system can include a computer controlled metering and weight batch system.

An embodiment of a thermal kinetic compounding apparatus includes a horizontally positioned mixer and compounding chamber with a central rotating shaft. Several staggered mixing elements are mounted to the shaft at different angles. The specific number and positions of the mixing blades varies with the size of the chamber. A pre-measured batch of thermoactive material and fermentation solid can be fed in to the compounder, for example, via an integrated screw which can be part of the rotor shaft. Alternatively, the thermoactive material and fermentation solid can be fed through a slide door, located on the mixer body. The apparatus can include an automatically operated discharge door at the bottom of the compounding chamber.

In the compounding chamber, the thermoactive material and fermentation solid is subject to high turbulence, due to high tip-speed of the mixing element. The thermoactive material and fermentation solid are well mixed and also subjected to temperature increase from impact against the chamber wall, mixing blades, and the material particles themselves. The friction in the moving particles can rapidly increase temperature and remove moisture. Thermal kinetic compounding can include compounding the quantities or concentrations listed above for the fermentation solid and thermoactive materials in batch size suitable for the apparatus.

The compounded thermoactive material and fermentation solid, the biopolymer, can then be run through a regrinding process to produce uniform granular materials. Such regrinding can employ a standard knife grinding system using a screen, which can create smaller uniform particles of a similar size and shape. Such granular materials can be used in, for example, extrusion, injection molding, and other plastic processing.

Compounding by Extruding

The present biopolymer can be formed by any of a variety of extruding processes suitable for mixing or compounding fermentation solid and thermoactive material. For example, conventional extruding processes, such as twin screw compounding, can be employed to make the present biopolymer. Compounding by extruding can provide a higher internal temperature within the extruder and promote the interaction of thermoplastics with the fermentation solid. Twin screw compounding can employ co- or counter-rotating screws. The extruder can include vents that allow escape of moisture or volatiles from the mixture being compounded.

Forming Biopolymer into Products

Biopolymer material can be formed into a variety of objects and structures. In one embodiment, raw biopolymer can be formed into pellets which are fed into machinery configured to injection mold, extrude, or otherwise form or process the biopolymer. In an embodiment, pellets can be formed by first urging polymer and fermentation solids through a die to produce a linear extrusion and then cutting the extrusion into a pellet shape. In an embodiment, the pellets have a substantially uniform size and shape. The cross-section of the pellet can be any of a variety of shapes, such as square, circular, oval, rectangular, pentagonal, hexagonal, etc., as determined by depending on the shape of the extrusion die. A circular cross section can be preferred in many applications, typically with a radius of several millimeters and length of about two to four time the radius. U.S. Pat. Nos. 5,441,801, 6,280,667, and 5,746,958, which are incorporated herein by reference, further discuss processing of pellets of polymer materials. These patents disclose methods and apparatus employed for processing plastics with wood fillers. These methods and apparatus can also be employed to process and form embodiments of the present biopolymer.

While specific biopolymer products are described hereinbelow, other products are also possible. For example, biopolymer can be used in boat hulls, playground sets, storage containers, crown molding, and the like.

Injection Molding the Biopolymer

Embodiments of the present biopolymer can be injection molded. In an embodiment, compounded biopolymer can be ground to form uniform pellets for use in an injection molding process. In an embodiment, the present polymer can be processed using less energy per pound than conventional thermoplastics. In an embodiment, the present biopolymer can exhibit faster heating and cooling times during injection molding compared to conventional thermoplastics. In an embodiment, the present biopolymer maintains the melt index of the plastic and allows flowability characteristics that allows high speed injection molding. For example, biopolymer including fermentation solid and polypropylene was observed to have higher thermal conductivity than pure polypropylene. Higher thermal conductivity provides faster heating and/or cooling, which can which can speed processes such as injection molding.

Injection molding techniques are known to those skilled in the art. In an embodiment, machinery can be configured to injection mold biopolymer into a desired shape. A mold defines a shape, into which heated thermoactive material is injected. The material is then allowed to cool and subsequently ejected from the mold.

Extruding the Biopolymer

The present biopolymer can be extruded to form an article of manufacture employing any of a number of conventional extrusion processes. For example, the present biopolymer can be extruded by dry process extrusion. For example, the present biopolymer can be extruded using any of a variety of conventional die designs. In an embodiment, extruding the present biopolymer to form an article can include feeding the biopolymer into a material preparation auger and converting it to a size suitable for extruding. Extruding can employ any of a variety of conventional dies and any of a variety of conventional temperatures. Compounding by extruding can provide a higher internal temperature within the extruder and promote the interaction of thermoplastics with the fermentation solid.

An extruder having one or more dies can be configured to form the biopolymer into a shape. The biopolymer can be urged through a die to produce a desired cross section. The extruded biopolymer can then be cut to a desired length as necessary. The biopolymer can also be allowed to harden or otherwise cured to preserve the cross-sectional shape. Extruded biopolymer can later be cut into shorter lengths as desired.

In an embodiment, the biopolymer material can be heated above the melting point. The biopolymer can then be moved through a converging die that is heated to reduce shear stress in the biopolymer near the wall and then through a forming section to provide a desired cross section. In an embodiment, the biopolymer can then be passed through a low-friction unheated or thermally insulated section that has a cross section that is the same or similar to the cross section of the forming section to establish a cross sectional memory in the polymer and reduce swelling after extrusion. The biopolymer material can then be quenched to form a shell below the melting point. In embodiments, the shell can substantially maintain the biopolymer in the desired shape. Further description of methods and apparatus for fabricating extrusions of thermoactive material is provided by U.S. Pat. No. 6,527,532, which is incorporated herein by reference. This patent discloses methods and apparatus employed for processing and forming plastics with wood fillers. These methods and apparatus can also be employed to process and form embodiments of the present biopolymer.

In another embodiment, machinery can be configured to move biopolymer through a transition die and then through a stranding die to produce strands of biopolymer. Machinery can further be configured to move the strands through a molding die that combines the strands into a desired extrusion. In one embodiment, this stranding and re-bonding process can produce a product having a structure and/or appearance that is similar to the grain in wood. Methods and apparatus for stranding and re-bonding thermoactive materials are further described in U.S. Pat. No. 5,516,472, which is incorporated herein by reference. This patent discloses methods and apparatus employed for processing plastics with wood fillers or other shredded cellulosic material. These methods and apparatus can also be employed to process and form embodiments of the present biopolymer.

Co-Extruding Materials with the Biopolymer

Additional materials can be co-extruded with the biopolymer. In an embodiment, a layer or sheet of another material (e.g., a coating or thermoactive material) can be co-extruded with the biopolymer. In an embodiment, the co-extruded layer or sheet can provide desired surface properties, structural properties, and/or appearance.

Foaming the Biopolymer

In an embodiment, the present biopolymer can be foamed either from its soft, raw form or upon melting without addition of foaming or blowing agents. Surprisingly, the present biopolymer can foam upon extruding even in the absence of foaming agents to produce a rigid, strong hardened foam. Although not limiting the present invention, it is believed that the present foam can result from foaming of protein in the fermentation solid.

The stiff or solid foam can exhibit greater strength (e.g., flexural modulus) compared to conventional foamed plastics at the same density. Conventional plastics decrease in strength when foamed. Although not limiting to the present invention, it is believed that the present biopolymer foam may include denatured protein interacting with the thermoactive material to create an advantageously strong biopolymer foam.

The present biopolymer (e.g., in the form of pellets) can be converted to a biopolymer foam by injection molding, extrusion, and like methods employed for forming plastics. Although not limiting to the present invention, it is believed that the heat and kinetic energy applied in these processes, such as by a mixing screw, is sufficient to foam the present biopolymer. In injection molding, the mold can be partially filled to allow the foaming action of the biopolymer to fill the cavity. This can decrease the density of the molded article without using chemical foaming or blowing agents. Extruding can also be employed to foam the present biopolymer. The dies used in extruding can form the foamed biopolymer.

In an embodiment, a foamed biopolymer can be produced by mixing a foaming agent with fermentation solids and thermoactive material. In an embodiment, biopolymer can be foamed without pre-fabrication into pellets by mixing fermentation solids and thermoactive material with a powdered foaming agent, heating and compounding the mixture and then extruding the biopolymer. In an embodiment, vacuum can be used to remove vapors. In an embodiment, greater expansion occurs in the center of an extruded profile than at the perimeter of the profile, such that the extruded product has a higher density near the exterior than on the interior. Methods for combining particulate and polymer with a foaming agent to produce a foamed product with a desired density are described in U.S. Pat. No. 6,153,293, which is incorporated by reference. This patent discloses methods and apparatus employed for processing plastics with wood fillers. These methods and apparatus can also be employed to process and form embodiments of the present biopolymer.

It may be desirable to process biopolymer ingredients into fine particulate to allow for effective foaming. In an embodiment, ingredients can first be processed into a biopolymer product and then the biopolymer can be re-ground into fine particles to facilitate foaming into a foamed product shape.

In an embodiment, foamed biopolymer can be created by creating discontinuities in a biopolymer material. The discontinuities are expanded and the biopolymer is then stabilized to preserve the discontinuities by cooling or crosslinking. In an embodiment biopolymer can be made using foaming agents such as an inert gases (e.g. nitrogen or carbon dioxide, hydrocarbons, chlorinated hydrocarbons, chlorofluorocarbons) or a decomposing chemical blowing agent that dissolves or disperses into biopolymer in liquid form and which decomposes to an inert gas at elevated temperatures. The expansion associate with foaming agents or decomposing chemical blowing agents cause expansion of cell structures to develop a foamed biopolymer. The foaming process can be control through control of the extrusion temperature and other parameters.

An embodiment of a foamed component includes a solid outer layer or shell and an interior formed of foamed biopolymer. Foamed biopolymer components can be configured to offer relatively low weight and high stiffness compared to solid components. Foamed biopolymer can be formed for example into components such as sized lumber, posts, beams, trim, shaped structural members, furniture board, and trim components. It can be desirable to form components with a specific gravity lower than water, so the components float, or to approximate the density of wood lumber. Window or door components can also be formed from foamed biopolymer. Components combining hollow and foamed cores are also possible.

U.S. Pat. No. 6,054,207, 6,153,293, 6,280,667, and 6,342,172 which are incorporated herein by reference, further describe processes and apparatus for fabricating thermoactive material into foamed products. These patents disclose methods and apparatus employed for processing plastics with wood fillers. These methods and apparatus can also be employed to process and form embodiments of the present biopolymer.

Processing Parameters and Structural Parameters

In an embodiment, biopolymer admixture can provide a higher flow or lower viscosity compared to typical mixtures that use dried fibers with a thermoactive material. This can allow for processing with significantly lower pressures during extrusion or injection molding. For example, pressures of compression molding a conventional fiber/polymer material can typically fall in the 500-1000 psi range. In contrast, in an embodiment, the present biopolymer can reach maximum density at less than 150 psi. In an embodiment, motor load for processing the present biopolymer can be decreased from 50% for conventional polymer to 10% for the present polymer.

The lower compression pressure requirement of embodiments of the present biopolymer can allow for significant changes to the engineering and structure of pressing or extrusion equipment for the biopolymer and lower the costs of such equipment. In an embodiment, equipment for processing the biopolymer can also be configured with lower processing temperature. In an embodiment, processing temperature can be reduced from 400 degrees Fahrenheit for conventional polymer to 320 degrees Fahrenheit for an embodiment of the present biopolymer.

Mechanical properties for lumber replacements (or other structures) can be quantified and tested for a variety of parameters. Biopolymer ingredients and manufacturing processes can be manipulated to achieve desired combinations of properties. Properties that can be considered include density, surface hardness, shear strength and bending properties, retention force (for retaining nails, screws, or other fasteners), strip-out properties, coefficient of thermal expansion, and Young's modulus. In an embodiment, structural parameters can be manipulated by altering the percentage of fermentation solids in the biopolymer.

U.S. Pat. No. 5,539,027, which is incorporated herein by reference, further describes fabrication of structural polymer members. Testing of mechanical properties for structural members is described in U.S. Pat. No. 6,342,172, which is incorporated herein by reference. These patents disclose methods relating to processing plastics with wood fillers. These methods can also be employed to process and form embodiments of the present biopolymer.

Illustrated Embodiments

Examples of structural embodiments that can be formed from biopolymer are shown in FIGS. 1-8.

Sheet Products

Figure 7:
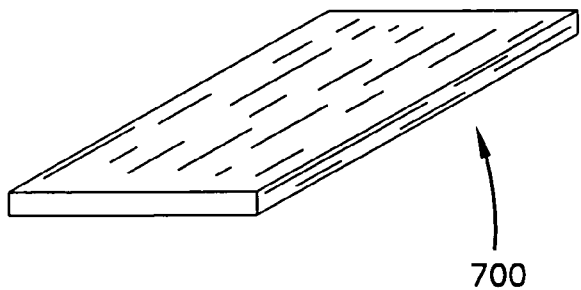
FIG. 7 shows a sheet product.

The present biopolymer can be formed into sheets. FIG. 7 shows an embodiment of a sheet product 700. An embodiment of a sheet product may be textured and/or printed to simulate other materials.

Structural Members

Figure 2:
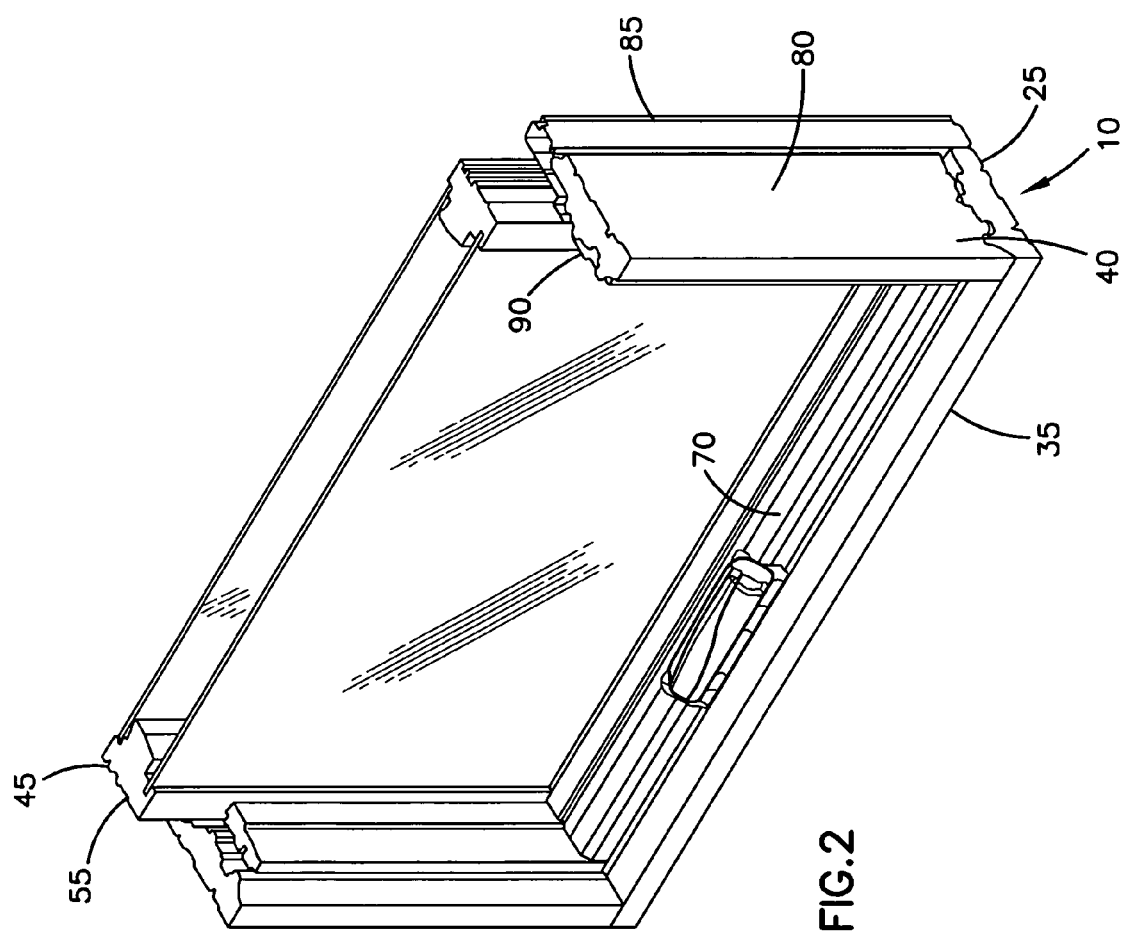
FIG. 2 shows a cross section of a window assembly.

In one embodiment, biopolymer can be formed into a structural member. In one embodiment, a structural member can be fabricated to replicate the properties and/or appearance of other materials. For example, in one embodiment, the biopolymer can be used to fabricate structural members of assemblies conventionally made from wood, plastic, or metal, such assemblies are shown in FIGS. 1 and 2. In an embodiment, biopolymer can be formed into a lumber replacement member, such as the member 600 shown in FIG. 6. The core 610 of member 600 can include solid biopolymer, foamed biopolymer, hollow voids, struts, webs, or a combination thereof. Lumber replacement members can be sized according to common industry parameters, e.g. 2×4, 2×2, 2×6, and the like.

Synthetic lumber members are further described in U.S. Pat. No. 5,725,939, which is incorporated herein by reference. This patent discloses methods and apparatus employed for processing plastics with wood fillers. These methods and apparatus can also be employed to process and form embodiments of the present biopolymer.

Lumber replacement sheets can also be formed from biopolymer. For example, biopolymer can be formed into a 4×8 sheet to replace standard plywood. Other types of sheets can also be formed.

Biopolymer can also be formed into more specialized lumber replacement members or other structural members, including members having more complex shapes. An exemplary sheet is shown in FIG. 7.

Components for Window and Door Assemblies

In one embodiment, the present biopolymer can be formed into components for doors and windows. FIG. 1 shows a window assembly, components of which can be constructed from biopolymer. Window assembly 10 includes a frame 25 which can be formed from a header 30, a sill 35, and jambs 40, all of which can be formed from the biopolymer material. Sash 45 can be formed from rails 50 and stiles 55. Rails 50 and stiles 55 can also be formed from the biopolymer. Muntins 60, casing 65, and trim components 70 (shown in FIG. 2) can also be formed from the biopolymer. While FIG. 1 shows a double-hung window, other types of window assemblies can be formed from the biopolymer, including but not limited to assemblies for casement windows, awning windows, fixed frame and circle head windows, transom windows, skylights, gliding windows, tilt-in windows, bowed windows, and bay windows.

Figure 5:
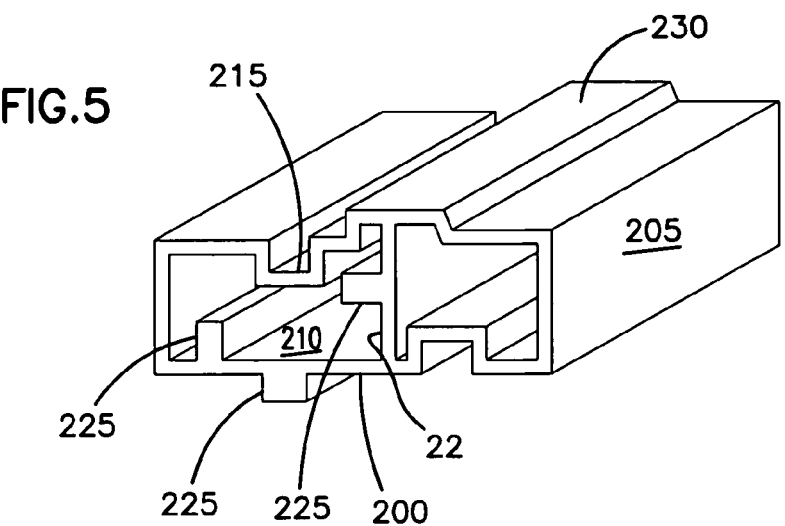
FIG. 5 shows a partially hollow extrusion.
Figure 6:
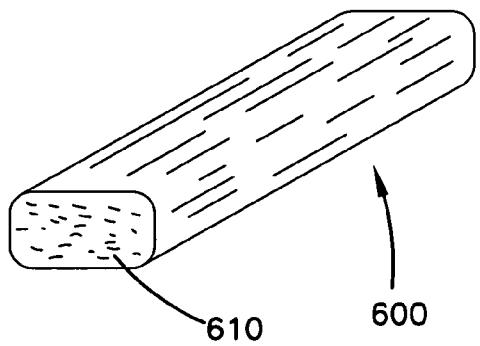
FIG. 6 shows a lumber replacement member with a wood-like appearance.

In an embodiment, specifically designed cross-sectional shapes can be formed to allow the biopolymer window or door components to fit together and fit with glass, trim or other components. An example of a member with a complex shape is shown in FIG. 5. In an embodiment, biopolymer components can be assembled in a thermo weld process in which components are heated and fused together. In an embodiment, thermal welding can produce a welded joint having greater strength and rigidity than typical assemblies made from wooden members. In an embodiment, a welded region can be finished using a tool to create a uniform transition and/or an attractive appearance. The tool can be for example a knife, a routing tool, or other shaper tools. In an embodiment, the tool can be heated to partially melt the biopolymer to promote a clean and attractive weld.

Window and door components are further described and shown in U.S. Pat. Nos. 5,486,553 and 5,497,594, which are incorporated herein by reference. These patents disclose methods and apparatus employed for processing plastics with wood fillers. These methods and apparatus can also be employed to process and form embodiments of the present biopolymer.

FIG. 2 shows a cross-section of a window. Solid components 80, hollow components 85, and sheet components 90 can all be formed from the biopolymer. In some embodiments, components are formed with a hollow cross-section and at least one structural web member to provide both light weight and sufficient strength and durability to withstand daily use. Embodiments of window assemblies can include into foamed components. An embodiment of a foamed component shown in FIG. 3 has a solid shell 95 with a foamed core 100. The core 100 shown in FIG. 3 could alternatively be hollow or webbed.

Figure 4:
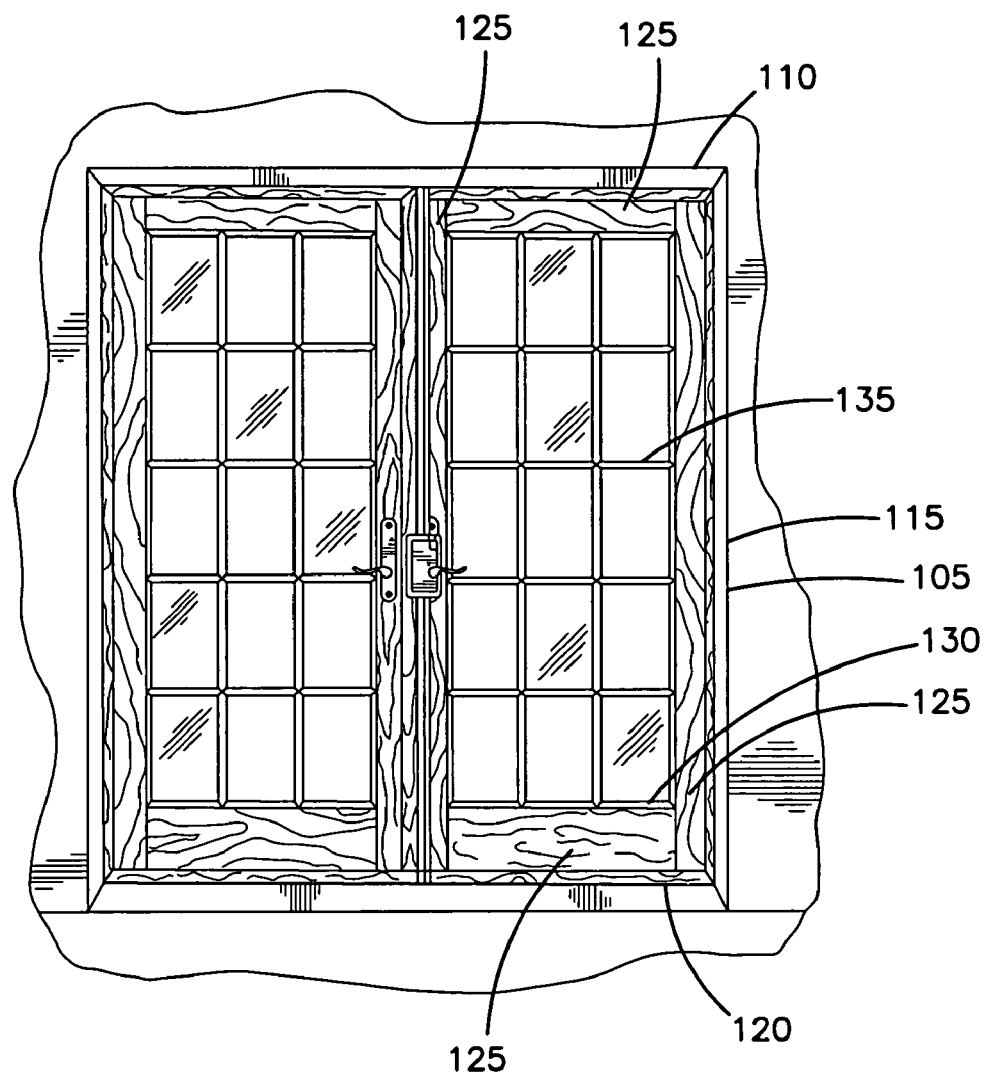
FIG. 4 shows a door assembly.

FIG. 4 shows a door assembly. Components for standard doors, French doors, sliding patio doors, and others types of doors can be formed from the biopolymer. The door assembly in FIG. 4 includes frame 105 including header 110, door jamb 115 and sill 120. The door includes panels 125, sash 130, and muntins 135. All of these components can be formed from the biopolymer material. Non-structural trim elements and molding can also be formed from the biopolymer.

Biopolymer components can be formed in hollow or semi-hollow configurations. In one embodiment, a component formed from the biopolymer includes a shell or wall and one or more internal supports. FIG. 5 shows an exemplary semi-hollow component that can be formed from the biopolymer material. The component includes an outer wall 200 having internal surfaces 205 and external surface 210. Grooves 215 or other premolded paths or features can be formed in the exterior surfaces to accommodate interface with related components. One or more internal struts 220 can be provided. One or more anchors 225 can also be provided. Anchors can be configured to receive a fastener such as a screw or bolt. Bonding surfaces 230 can also be provided to accommodate thermal-welding of biopolymer components to other thermoactive material or biopolymer components.

U.S. Pat. No. 5,406,768, which is incorporated by reference, further describes component structures. This patent discloses methods and apparatus employed for processing plastics with wood fillers. These methods and apparatus can also be employed to process and form embodiments of the present biopolymer.

Siding Products

Siding products for building structures can also be formed from the biopolymer. In one embodiment, siding product can be provided in sheet form. Siding product can for example replicate stone or marble.

Figure 8:
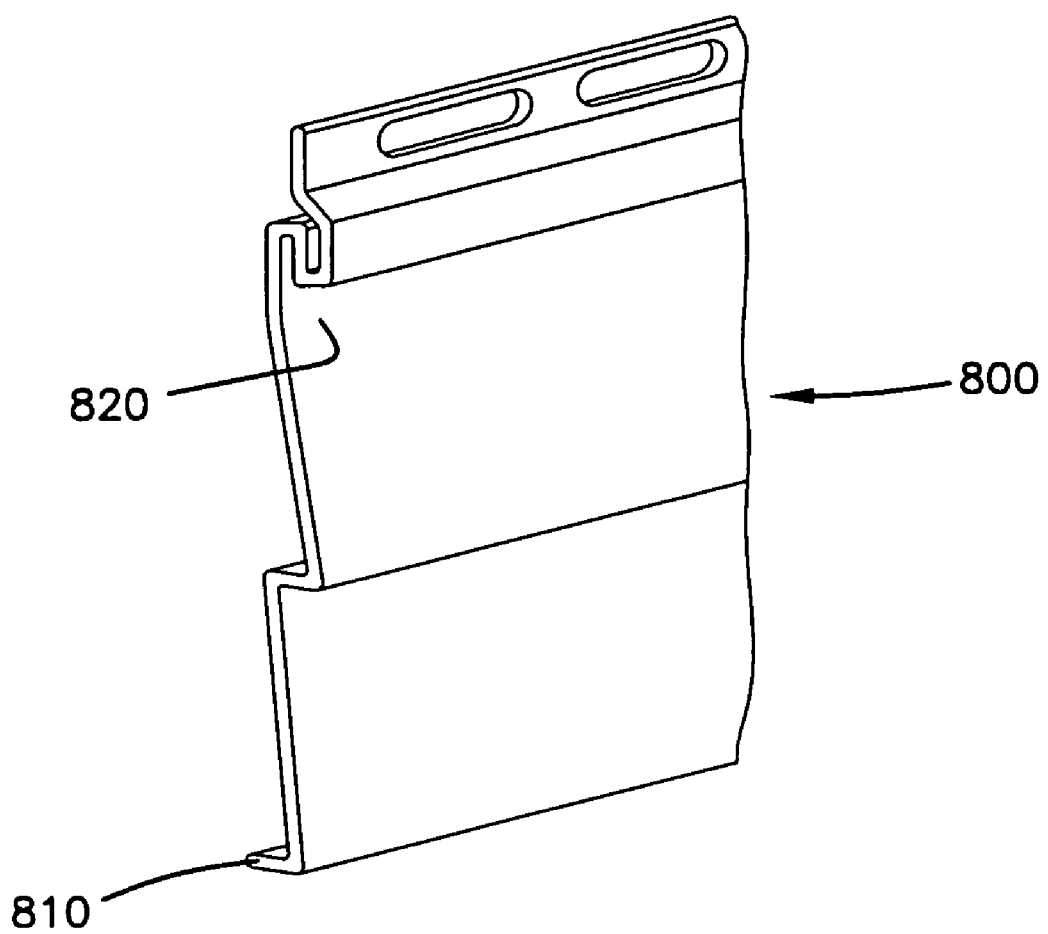
FIG. 8 shows a siding product for a building structure.
Figure 9:
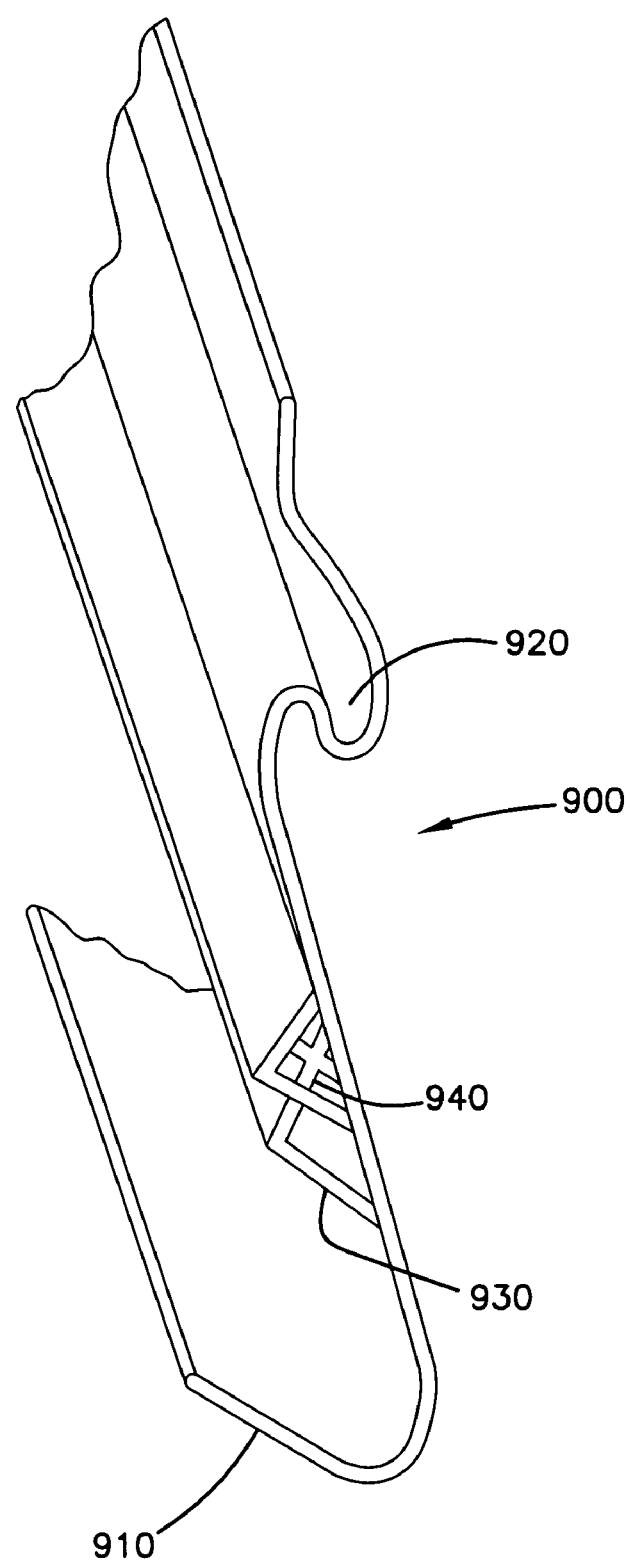
FIG. 9 shows a back perspective view of the siding product of FIG. 8.
Figure 10:
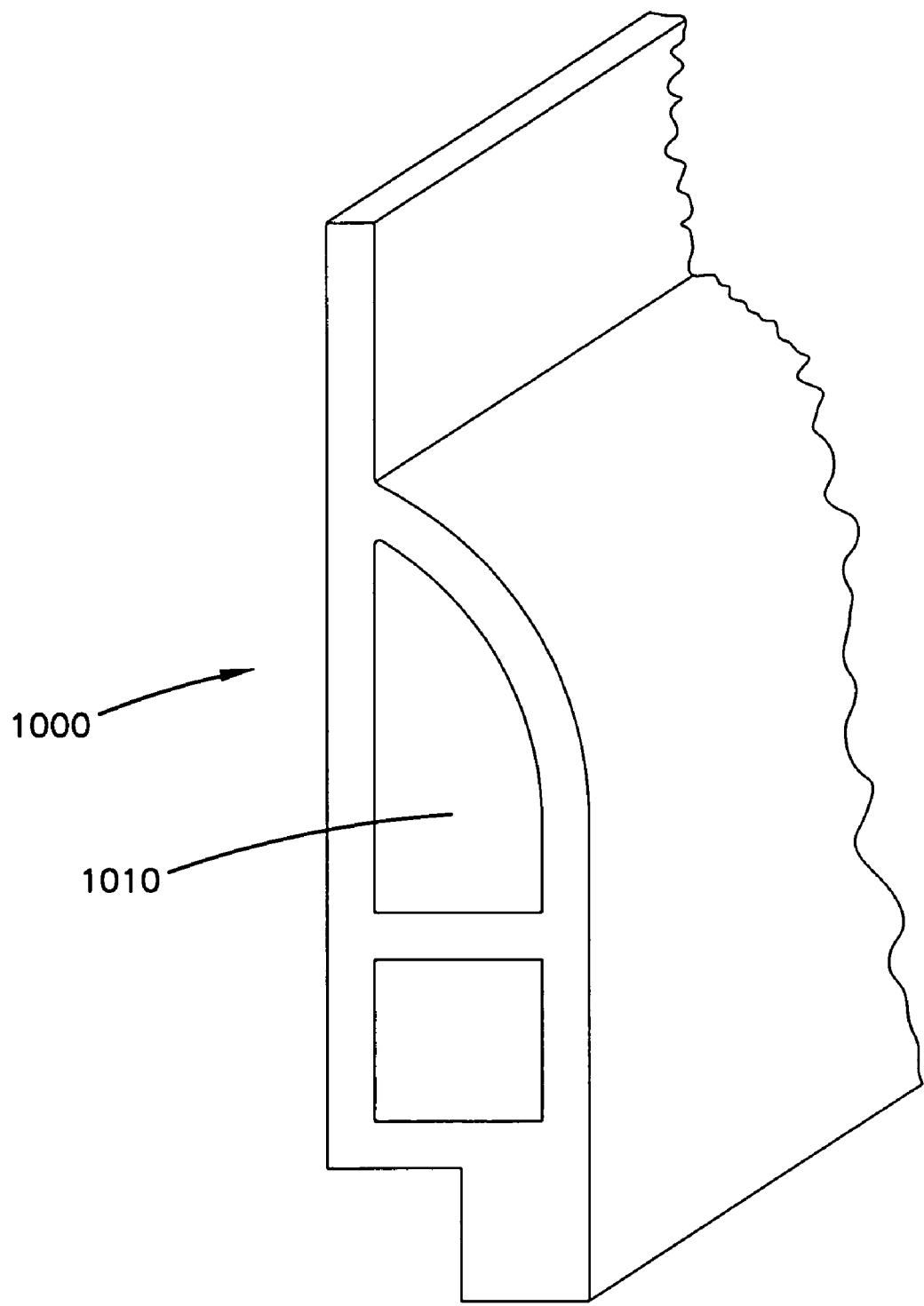
FIG. 10 shows a siding product including an interior region that can be foamed or hollow.

In another embodiment, siding product can be provided in the form of slats, similar to wood, aluminum, or vinyl siding. FIG. 8, for example, shows a siding product including a longitudinal member 800. FIGS. 9 and 10 also show a siding members 900, 1000. In an embodiment, the biopolymer can be formed into longitudinal members having mating structures such that adjacent members can be connected. For example, a tongue 810 and groove 820 arrangement can be used to connect a longitudinal member to a like member situated above or below. An embodiment of a longitudinal members can include stiffening struts 930 or a supporting web 940 to add stiffness as shown in FIG. 9.

An embodiment of a siding member can include portions which are foamed or hollow. FIG. 10 show an embodiment 1000 having an internal portion 1010 that can be foamed or hollow. An embodiment having a hollow portions can also include a web of structural supports, as shown for example in FIG. 8. Embodiments of foamed or hollow portions can increase the R value of the siding. Embodiments with foamed or hollow portions can also make the siding member more rigid and exhibit less creep. Embodiments may also include combinations of at least two of foam, hollow portions, and webbed portions.

An embodiment of a siding assembly can include siding members that can be connected end-to-end by thermal welding. The exposed surface of a siding member can be printed, coated, covered or otherwise processed to improve weatherability and/or appearance, as described below.

Formation of siding assemblies is further described in U.S. Pat. No. 6,122,877, which is incorporated by reference. This patent discloses methods and apparatus employed for processing plastics with wood fillers. These methods and apparatus can also be employed to process and form embodiments of the present biopolymer.

Coatings, Textures, and Appearance

The biopolymer can be treated for appearance during or after forming. For example, the die or other surface used in forming can form a textured surface on the biopolymer article. Extruding can co-extrude an appearance layer of polymer or other material with a biopolymer core. After forming, the formed biopolymer can be treated with a multi roller printing process to impart the look of real wood or other desired printed textures or colors. After forming, the formed biopolymer can be treated with a thermosetting powder. The thermosetting powder can be, for example, clear, semi-transparent, or fully pigmented. The powder can be heat cured, which can form a coating suitable for interior or exterior uses. The powder can also be textured to provide, for example, a natural wood look and texture.

In an embodiment, the biopolymer products can be powder coated, embossed, and/or printed to provide desired surface properties such as weatherability and UV-resistance and/or surface effects such as wood grain colors and textures.

In an embodiment, a biopolymer product can be formed with a protective layer. In an embodiment, a biopolymer product can be coated with a thermosetting powder that is baked on to cure the powder into a high performance coating. The powder can for example be polyester, epoxy, acrylates, or other polymers or thermoactive material, or a combination thereof. The coating can be clear, semi-transparent, or fully pigmented. In one embodiment, the powder coated biopolymer product can be baked in an infrared or IR/UV oven. Such a coated product can be appropriate for both internal and exterior usage.

In an embodiment, a thin layer of resin or other material can be added to a surface. An embodiment of siding material, for example, can be fabricated with a protective resin layer to enhance weatherability. Addition of a surface layer can also be useful in other applications, including for example interior applications where exposure to cleaning agents can occur (e.g. tub or shower areas), and exterior applications such as building trim, shutters, lawn and garden equipment, decorative panels and signs, or patio furniture.

In an embodiment, a biopolymer product can be vinyl wrapped or metal wrapped.

Biopolymer products can be given a wood appearance and/or texture (or other texture/appearance) through processing such as embossing or printing, or by co-extruding an outer layer with the biopolymer. Siding assemblies, for example, can be patterned with a wood grain appearance or texture. Sheet products may also be patterned and coated to provide a wood grain appearance or other appearance. Other wood-replacement products can similarly be processed to resemble particular woods (or stained woods) in texture and color.

In one embodiment, the biopolymer product can be run through a multiroller printing process to impart the look of real wood or other desired printed textures or colors, such as stucco, concrete, bricks, stone, tile, clay, or metal. In other embodiments, an extrusion can be directly printed using a gravure printing process or an embossing wheel. The combination of color and texture can create a natural wood look and feel. Other printing process also can be used, including direct computer imagery. In an embodiment, printing or other methods can create realistic wood textures such as maple, oak, cherry, cedar or other desired prints and textures. In one embodiment, the biopolymer material can be placed in a thermal plated press during the curing process both to impart faster curing and to impress a texture onto the surface of the end product.

In an embodiment, an exterior product can be formed using fermentation solids in conjunction with a powder coating for exterior products. In an embodiment, the exterior product can be printed with a desired appearance and/or textured in a press with a texture plate to form an exterior grade textured surface. In another embodiment, similar processes can be employed to generate a rough-service product.

In another embodiment, the biopolymer can be printed and then coated to protect the printed surface. The biopolymer may be digitally printed for example, to impart a desired appearance such as the grain of a particular wood, such as cherry. The biopolymer may then be powder coated to protect the printed surface. In an embodiment, the biopolymer may be powder coated with a clear layer to allow the printed surface to show through.

In another embodiment, an outer layer is applied to the product. The outer layer can for example be a veneer, a wood grain covering, a pigmented covering, or another type of co-extruded layer. The outer layer can provide a desired color, appearance, texture, weatherability, or other property.

In another embodiment, the biopolymer can be made to look like granite. In an embodiment, the biopolymer can include visible particles of remaining fermentation solid. Such a composite biopolymer can result in a matrix of one appearance surrounding particles with a different appearance, giving the appearance of granite. In such a composite biopolymer, a significant fraction of the fermentation solid can be blended into and/or bonded with the thermoactive material.

In another embodiment, particulate matter can be added to the biopolymer. Embodiments including particulate matter can be formed to simulate the appearance of granite or other stones, or natural wood grains such as burled wood. In an embodiment, particulate can be fused into a biopolymer product for example by mixing in the particular during extrusion molding or compression molding. In an embodiment, particulate does not dissolve into the polymer but remains distinct, so that the particulate matter is visible to the naked eye. In an embodiment, particulate can be combined in a polymer to give a desired aggregate appearance. In an embodiment, the biopolymer with aggregate matter can be machined, cut, drilled, or otherwise processed. Further description of polymer-particulate material is provided in U.S. Pat. No. 5,635,123, which is incorporated by reference.

Figure 11:
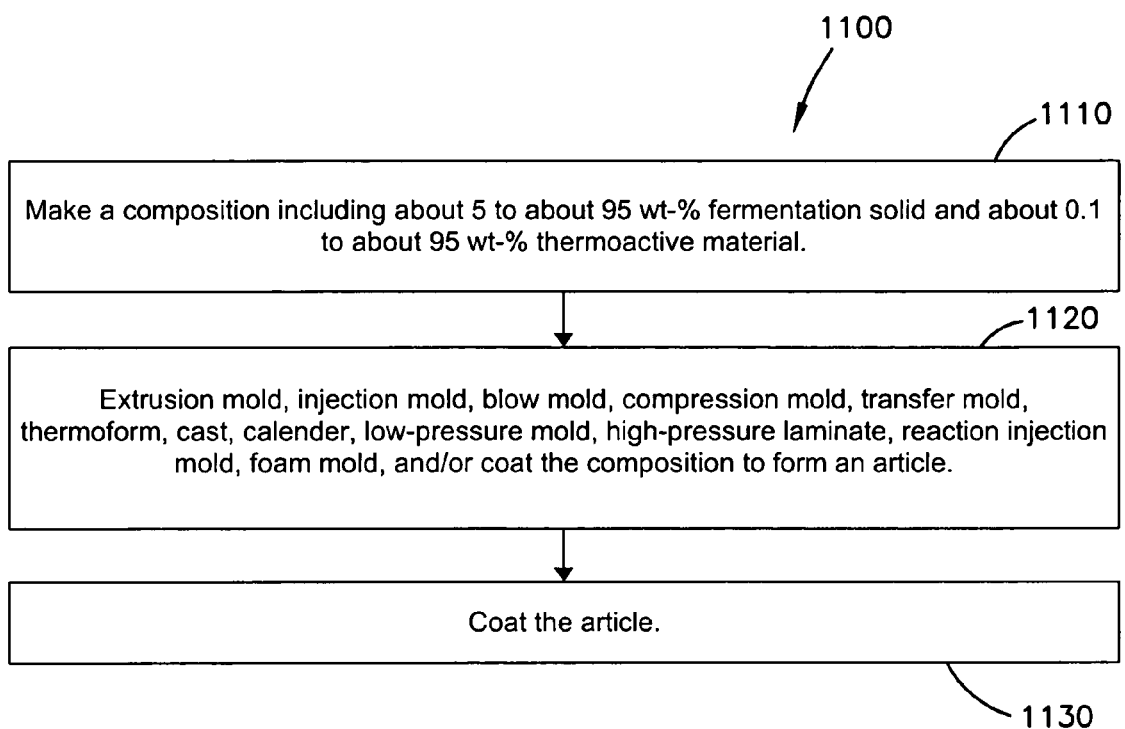
FIG. 11 illustrates a method for processing a biopolymer composition.

FIG. 11 shows a flow chart 1100 illustrating a process of making an article. A composition is made at 1110 that includes about 5 to about 95 wt-% fermentation solid and about 0.1 to about 95 wt-% thermoactive material. The composition is formed 1120 into an article by molding, injection molding, blow molding, compression molding, transfer molding, thermoforming, casting, calendering, low-pressure molding, high-pressure laminating, reaction injection molding, foam molding and/or coating. In an embodiment, the article can be coated 1130 after forming.

Figure 12:
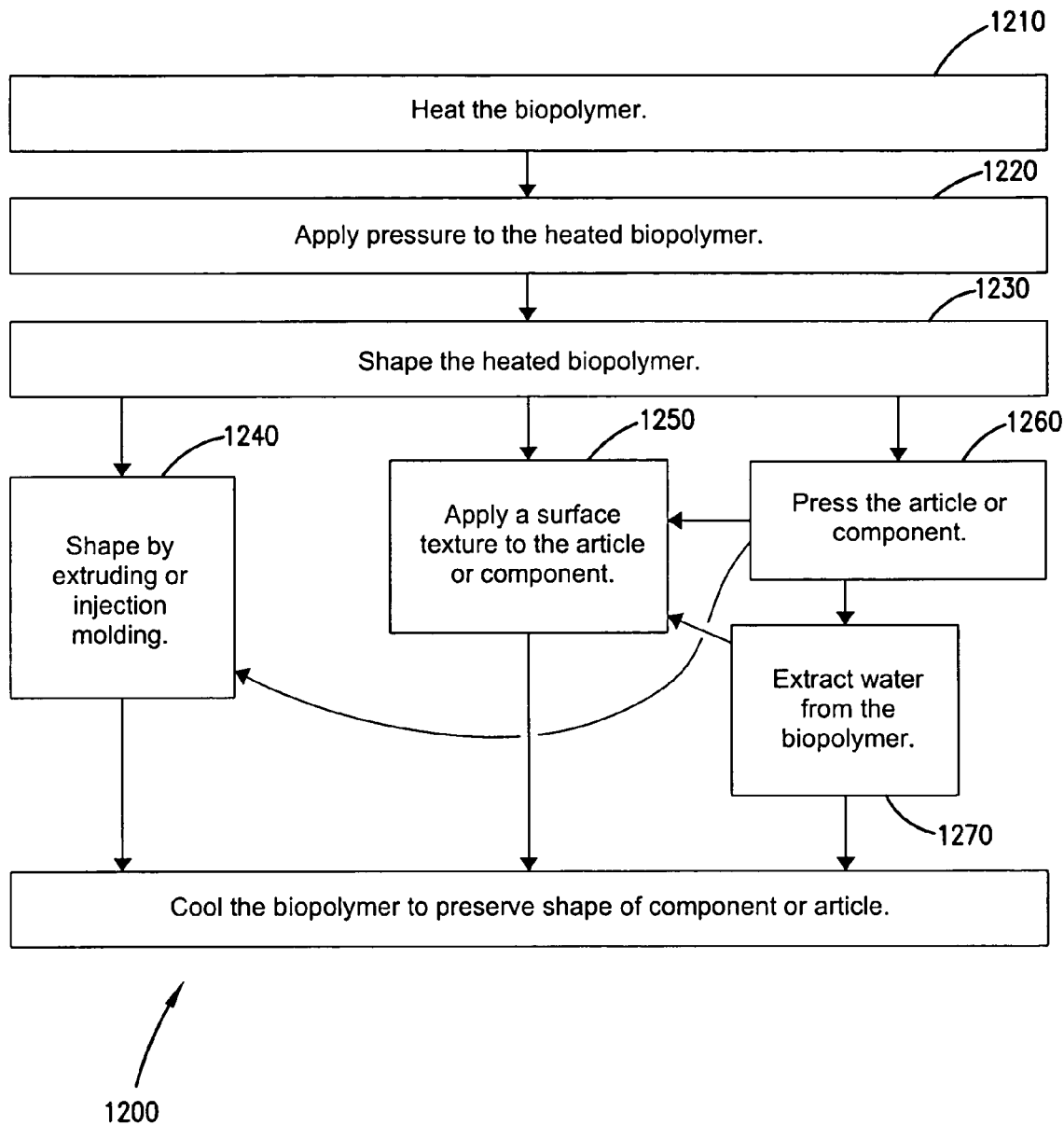
FIG. 12 illustrates a method for forming an article from a biopolymer.

FIG. 12 shows a flow chart 1200 illustrating a process by which the present biopolymer can be fabricated into a lumber replacement article, window or door component, or siding component. A biopolymer is heated 1210. Pressure is applied 1220 to the heated biopolymer. In an embodiment, heating and application of pressure can occur simultaneously or application of pressure can begin first. Heated biopolymer can be shaped 1230 into an article or component. In an embodiment, the biopolymer can be shaped by extruding or injection molding 1240. In an embodiment, the article can be pressed by pressing 1260 the article or component. In an embodiment, pressing the biopolymer extracts water 1270 from the biopolymer. Pressing for example can create a sheet product or other product or can prepare biopolymer for subsequent extruding or injection molding. In an embodiment, further processing can occur during or after shaping, including for example further shaping, cutting, machining, or surfacing. In an embodiment, a surface texture can be applied 1250 to the article or component. The surface texture can be applied for example by co-extruding or by impressing the surface with a die. Other techniques for creating a surface texture can also be used. The biopolymer is cooled 1280 to preserve the shape of the component or article.

EXAMPLES

Example 1

Biopolymer Production by Thermal Kinetic Compounding

The present example describes preparation of a biopolymer according to the present invention and that included fermentation solid (e.g., DDG, a particular fermented protein solid), polypropylene, and maleated acid. For example, these components were taken in a ratio of 60/38/2 and were compounded using a Gelimate G1 thermal kinetic compounder. The other ratios listed in the table were compounded according to the same procedure. Compounding was conducted at 4400 RPM; the material was and ejected from the compounder at a temperature of 190° C. The polypropylene was a commercial product called SB 642 and supplied by Basell Coproration. The biopolymer left the compounder as a dough like mass that resembled bread dough (soft or raw biopolymer). The soft or raw biopolymer was granulated in a conventional knife grinding system to create pellets.

Pellets of the present biopolymer were injection molded in a standard "dogbone" mold on an Toshiba Electric Injection molding press at a temperature in all three zones of 320°

F. As a control, the commercial polypropylene alone was also molded by the same procedure.

The resulting dogbones were tested in accordance to ASTM testing standards for plastic for tensile strength, flexural modulus, modulus of rupture to determine mechanical strengths. The following results were obtained:

| Polymer | Tensile Strength (lbf, ASTM) | Flexural Strength (psi, ASTM) | Displacement (Stretching) Tensile Testing (inches, ASTM) |
|---|---|---|---|
| 100% Polypropylene | 130 | 61,000 | 0.22 |
| Biopolymer Embodiment 1 (50 wt-% fermented protein solid and 50 wt-% polypropylene) | 140 | 140,000 | 0.11 |
| Biopolymer Embodiment 2 (70 wt-% fermented protein solid and 30 wt-% polypropylene) | 130 | 210,000 | 0.061 |
| Biopolymer Embodiment 3 (60 wt-% fermented protein solid, 38 wt-polypropylene, 2 wt-% maleated polypropylene) | 140 | 220,000 | 0.071 |

Surprisingly, adding fermentation solid (e.g., fermented protein solid) to a plastic increased the strength of the plastic. The present biopolymer was stronger than the thermoactive material from which it was made. This result is illustrated in each of the three measures of strength for each polymer.

The present biopolymer exhibited greater tensile strength than the plastic control. This was surprising. Conventional filled plastic materials (filled, for example with inert filler) typically have less tensile strength than the plastic material from which they are made. In particular, a conventional filled plastic material with as much as 50 wt-% or 70 wt-% inert filler would have less tensile strength than the plastic from which it was made. In this example, biopolymers with 50 wt-% or 70 wt-% fermentation solid (e.g., fermented protein solid) each exhibited greater tensile strength than the plastic control. In this example, the present biopolymer gained additional tensile strength upon addition of a cross-linking agent.

The present biopolymer exhibited greater flexural modulus than the plastic control. In this example, biopolymers with 50 wt-% or 70 wt-% fermentation solid (e.g., fermented protein solid) each exhibited greater flexural modulus than the plastic control. In this example, the present biopolymer gained additional flexural modulus upon addition of a cross-linking agent.

The present biopolymer exhibited decreased displacement (less "stretch") compared to the plastic control. In this example, biopolymers with 50 wt-% or 70 wt-% fermentation solid (e.g., fermented protein solid) each exhibited decreased displacement compared to the plastic control. Generally, decreased stretch can be considered to relate to increased thermal, process, and structural stability.

Example 2

Biopolymer Production by Extrusion

The following extrusion parameters have been employed for producing a biopolymer according to the present invention.

| Conical Counter Rotating Extruder | |
|---|---|
| RT (Resin Temperature) | 178 C. |
| RP (Resin Pressures) | 11.9 |
| Main Motor (%) | 32.3% |
| RPM | 3.7 |
| D2 (Die Temperature Zone 2) | 163 |
| D1 (Die Temperature Zone 1) | 180 |
| AD (Die) | 180 |
| C4 (Barrel Heating Zone 4) | 177 |
| C3 | 181 |
| C2 | 194 |
| C1 | 208 |
| Screw Temperature | 149 |

(Temperature in Degrees C.)
(Equipment TC85 milicron CCRE)

An admixture of 15% polypropylene ("PP") and 85% DDG blended@ 7%MC was compounded using a high shear compounding system, then extruded at the above processing parameters through a hollow die system. Note that DDG contains protein, fiber, fat, and ash components. The second tests used 15% PP and 85% cellulose fiber (wheat) as a comparison in the exact same process, equipment and process parameters above.

In an initial comparison of the testing of this embodiment, there were many differences between the embodiment of the present biopolymer extrusion as compared to the fiber/PP extrusion. The fiber/PP extrusion closely simulates today's current wood plastic fiber technology and overall performance. The fiber/PP extrusion was a very different color showing the individual fibers and particles in addition in having an overall very dark color. This conventional material also showed poor mechanical strength characteristics and brittleness whereas the biopolymer has higher degrees of overall rupture and stiffness.

The embodiment of the present biopolymer maintained its lighter color and was very homogenous in appearance. This indicates that the present biopolymer intermeshed or melted together under the extruder condition employed.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "adapted and configured" describes a system, apparatus, or other structure that is constructed or configured to perform a particular task or adopt a particular configuration to. The phrase "adapted and configured" can be used interchangeably with other similar phrases such as arranged and configured, constructed and arranged, adapted, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

What is claimed is:

1. A method of making an article, the method comprising:
forming the article from a composition comprising:
   about 5 to about 95 wt-% fermentation solid, wherein the fermentation solid comprises distiller's dried grain-200; and
   about 0.1 to about 95 wt-% thermoactive material.

2. The method of claim 1, comprising: about 50 to about 70 wt-% fermentation solid; and about 20 to about 50 wt-% thermoactive material.

3. The method of claim 1, wherein the thermoactive material comprises at least one of thermoplastic, thermoset material, and resin and adhesive polymer.

4. The method of claim 1, wherein the thermoactive material comprises at least one of polyethylene, polypropylene, and polyvinyl chloride.

5. The method of claim 1, wherein the article is in the form of an integral biopolymer, a composite biopolymer, or an aggregate biopolymer.

6. The method of claim 1, wherein the article further comprises at least one of dye, pigment, hydrolyzing agent, plasticizer, filler, preservative, antioxidants, nucleating agent, antistatic agent, biocide, fungicide, fire retardant, flame retardant, heat stabilizer, light stabilizer, conductive material, water, oil, lubricant, impact modifier, coupling agent, crosslinking agent, blowing or foaming agent, and reclaimed or recycled plastic.

7. The method of claim 1, wherein the article further comprises at least one of plasticizer, light stabilizer, and coupling agent.

8. The method of claim 1, wherein forming comprises one or more of extrusion molding, injection molding, blow molding, compression molding, transfer molding, thermoforming, casting, calendering, low-pressure molding, high-pressure laminating, reaction injection molding, foam molding, and coating.

* * * * *